(12) United States Patent
Kamiya et al.

(10) Patent No.: US 8,186,627 B2
(45) Date of Patent: May 29, 2012

(54) ATTITUDE CONTROL DATA CREATING METHOD, AND ATTITUDE CONTROL SYSTEM APPLYING THE METHOD

(75) Inventors: Toshio Kamiya, Tokyo (JP); Ken Maeda, Tokyo (JP); Tatsuaki Hashimoto, Kanagawa (JP); Shinichiro Sakai, Kanagawa (JP)

(73) Assignees: NEC TOSHIBA Space Systems, Ltd., Tokyo (JP); Japan Aerospace Exploration Agency, Tokyo (JP)

( * ) Notice: Subject to any disclaimer, the term of this patent is extended or adjusted under 35 U.S.C. 154(b) by 685 days.

(21) Appl. No.: 12/300,449

(22) PCT Filed: May 2, 2007

(86) PCT No.: PCT/JP2007/059809
§ 371 (c)(1),
(2), (4) Date: Feb. 9, 2009

(87) PCT Pub. No.: WO2007/132793
PCT Pub. Date: Nov. 22, 2007

(65) Prior Publication Data
US 2009/0218449 A1 Sep. 3, 2009

(30) Foreign Application Priority Data
May 12, 2006 (JP) ................................. 2006-133696

(51) Int. Cl.
*B64G 1/36* (2006.01)
(52) U.S. Cl. .................................................. 244/171
(58) Field of Classification Search .......... 244/164–171; 701/4, 13, 226
See application file for complete search history.

(56) References Cited

U.S. PATENT DOCUMENTS

| | | | | |
|---|---|---|---|---|
| 4,567,564 A * | 1/1986 | Bittner et al. | ...................... | 701/4 |
| 4,687,161 A * | 8/1987 | Plescia et al. | .................. | 244/171 |
| 4,892,273 A * | 1/1990 | Fedor | ............................ | 244/165 |
| 5,257,802 A * | 11/1993 | Hablani | ....................... | 244/164 |

(Continued)

FOREIGN PATENT DOCUMENTS
JP    11-129997 A    5/1999
(Continued)

OTHER PUBLICATIONS

Toshiaki Yamashita et. al.: "Improved satellite attitude control using a disturbance compensator" ACTA Astronautica, vol. 55, No. 1, Jul. 2004, pp. 15-25.
Kamiya Toshio et. al. : "Preshaping Profiler for Flexible Spacecraft Rest-to-Rest Maneuvers" Aug. 2006, AIAA Guidance, Navigation, and Control Conference & Exhibit—AIAA Atmospheric Flight Mechanics Conference & Exhibit—AIAA Modeling and Simulation Technologies Conference & Exhibit—AIAA/AAS Astrodynamics Specialist Conference Exhibit : 21-24.

(Continued)

*Primary Examiner* — Galen Barefoot
(74) *Attorney, Agent, or Firm* — Sughrue Mion, PLLC

(57) ABSTRACT

In order to control an attitude of a movable object having a flexible member (50) through an attitude maneuver, first, based on vibration of the flexible member at the time of the attitude maneuver, for example, a sampling function including no frequency components equal to or higher than a particular frequency is obtained. With the use of the sampling function, a control target value is created as a previously-frequency-shaping-type feedforward control law. Based on the control target value, attitude control data is created. The attitude control data can be used for the attitude maneuver with respect to the movable object.

15 Claims, 6 Drawing Sheets

U.S. PATENT DOCUMENTS

| | | | | |
|---|---|---|---|---|
| 5,311,435 | A | * | 5/1994 | Yocum et al. .................. 244/164 |
| 5,806,804 | A | * | 9/1998 | Goodzeit et al. .............. 244/169 |
| 5,957,411 | A | * | 9/1999 | Liu et al. ......................... 244/169 |
| 6,125,310 | A | * | 9/2000 | Holmes .............................. 701/4 |
| 6,126,117 | A | * | 10/2000 | Sekine ........................... 244/164 |
| 6,205,378 | B1 | | 3/2001 | Rodden et al. |
| 6,347,262 | B1 | * | 2/2002 | Smay et al. .................... 244/164 |
| 6,622,969 | B2 | | 9/2003 | Yamashita |
| 6,845,951 | B2 | * | 1/2005 | Herman ......................... 244/164 |
| 7,917,256 | B2 | * | 3/2011 | Goodzeit et al. ................. 701/13 |
| 2003/0189137 | A1 | | 10/2003 | Herman |

FOREIGN PATENT DOCUMENTS

| | | |
|---|---|---|
| JP | 2001-063699 A | 3/2001 |
| JP | 2001-097291 A | 4/2001 |
| JP | 2002-255098 A | 9/2002 |
| JP | 3623747 B2 | 12/2004 |
| JP | 2006-008132 A | 1/2006 |

OTHER PUBLICATIONS

Qiang Liu, et al. "Robust Time-Optimal Control of Uncertain Flexible Spacecraft", Journal of Guidance, Control, and Dynamics, May-Jun. 1992, pp. 597-601, vol. 15, No. 3.

N.C. Singer, et al. "Preshaping Command Inputs to Reduce System Vibration", Journal of Dynamic Systems, Measurement, and Control, Mar. 1990, pp. 76-82, vol. 112.

* cited by examiner

ATTITUDE CONTROL DATA CREATING METHOD, AND ATTITUDE CONTROL SYSTEM APPLYING THE METHOD

TECHNICAL FIELD

This invention relates to an attitude control data creating method of creating attitude control data for an attitude maneuver with respect to a movable object such as a flying object and an attitude control system applying the method.

BACKGROUND ART

In general, for attitude change control with respect to a flying object having a flexible member, such as an artificial satellite, it is required, in many cases, that changing to a desired attitude be performed quicker and with higher accuracy. In such cases, the most problematic is the vibration of the flexible member. If the flexible member is vibrated due to the attitude change, the vibration is transmitted onto the main body of the flying object, causing an error in orientation of the main body. In addition, once the vibration has occurred on the flexible member, it takes a considerable amount of time for the vibration to attenuate. As can be seen from the above, with regard to the attitude change control of the flying object having the flexible member, a major challenge is how to suppress the vibration of the flexible member.

For example, JP 3623747 B (Document 1) discloses an attitude change control method for a three-axis-stabilized satellite or the like as technology relating to the attitude change (attitude control) with respect to an artificial satellite or the like. With this attitude change control method, when an attitude control target value is created, frequency separation is not performed with respect to frequency components included in the target value. As a result, it is impossible to prevent the flexible member (artificial satellite flexible moving unit) mounted on the artificial satellite or the like from being excited, and constant vibration of the flexible member lingers on even after the maneuver is completed. To be specific, after the maneuver is completed, a settling time for attitude stabilization (subsiding of vibration) is required before an observation mission is ready to be started. Accordingly, because orientation stability cannot be secured until the vibration subsides, the observation mission cannot be started. Consequently, the entire time (period of time from start of attitude maneuver to start of observation mission) required for the attitude maneuver becomes long.

Therefore, there have been proposed measures for suppressing the vibration of the flexible member at the time of the attitude change control. Examples of the measures include: an attitude maneuver control method for a flexible satellite by means of bang-bang control, which is proposed by N. C. Singer et al. (Document 2: see "Singer, N. C., Seering, W. P.: Preshaping Command Inputs to Reduce System Vibration, Journal of Dynamic Systems and Measurement Control, 112 (1990), pp. 76-82"); and an attitude maneuver control method for a flexible satellite by means of the bang-bang control, which is proposed by B. Wie et al. (Document 3: see "Liu, Q., Wie, B.: Robust Time-Optimal Control of Uncertain Flexible Spacecraft, Journal of Guidance, Control, and Dynamics, 15 (1992), pp. 597-604").

DISCLOSURE OF THE INVENTION

The bang-bang control of both Document 2 and Document 3 described above is aimed at a thruster being used as a control actuator, and hence is difficult to apply to a control actuator other than the thruster, such as a reaction wheel (RW) for rotating the attitude of an artificial satellite or a control moment gyro (CMG) for changing the attitude of the artificial satellite.

It can be said that the bang-bang control is effective in a case where the flexible member has only one flexibility mode. However, in most cases, actual flexible members are distributed parameter systems, and also have vibration systems having a plurality of dominant flexibility modes. Therefore, even if excitation of a particular flexibility mode can be prevented, it is impossible to prevent most of the other major flexibility modes from being excited.

It is therefore an object of this invention to provide an attitude control data creating method that makes it possible to shorten the entire time required for an attitude maneuver with respect to a movable object having a flexible member.

It is another object of this invention to provide an attitude control data creating method that makes it possible to effectively suppress the vibration at the time of the attitude maneuver even in the case where the flexible member of the movable object has a plurality of flexibility modes.

It is a further object of this invention to provide an attitude control system that makes it possible to shorten the entire time required for the attitude maneuver of the movable object having the flexible member.

It is a still further object of this invention to provide an attitude control system that makes it possible to effectively suppress the vibration at the time of the attitude maneuver even in the case where the flexible member of the movable object has a plurality of flexibility modes.

According to a first aspect of this invention, there is provided an attitude control data creating method of creating attitude control data for an attitude maneuver with respect to a movable object having a flexible member, including: a sampling function obtaining step of obtaining, based on vibration of the flexible member at a time of the attitude maneuver, a sampling function excluding frequency components equal to or higher than a particular frequency; a control target value creating step of creating, by means of the sampling function, a control target value as a previously-frequency-shaping-type feedforward control law; and a control data creating step of creating, based on the control target value, the attitude control data.

The control target value creating step may include creating the control target value by using, as the sampling function, a sinc function capable of creating a waveform of an attitude profile in which frequency components are completely separated.

The control target value creating step may include creating, as the control target value, data for acceleration/deceleration by shifting two positive and negative waveforms of the sampling function, which is the sinc function, by one period from each other and combining the waveforms.

The control target value creating step may include creating the control target value by multiplying the sinc function by a window function so as to suppress the vibration of the flexible member after the attitude maneuver to a maximum extent.

According to a second aspect of this invention, there is provided an attitude control system for controlling an attitude of a movable object having a flexible member through an attitude maneuver, including control target value creating means for creating, by means of a sampling function excluding frequency components equal to or higher than a particular frequency, a control target value as a previously-frequency-shaping-type feedforward control law.

The control target value creating means may obtain, based on vibration of the flexible member at a time of the attitude maneuver, the sampling function.

The attitude control system may further include attitude changing means for changing the attitude of the movable object by means of attitude control data created based on the control target value.

The attitude control system may further include attitude rotating means for rotating the movable object, the attitude rotating means being installed in the movable object.

The control target value creating means may create the control target value by using, as the sampling function, a sinc function capable of creating a waveform of an attitude profile in which frequency components are completely separated.

The control target value creating means may create, as the control target value, data for acceleration/deceleration by shifting two positive and negative waveforms of the sampling function, which is the sinc function, by one period from each other and combining the waveforms.

The control target value creating means may create the control target value by multiplying the sinc function by a window function.

The movable object may be an artificial satellite, and the flexible member may be a flexible moving unit mounted on the artificial satellite.

The flexible moving unit may include: a reaction wheel for rotating the attitude of the artificial satellite; and a control moment gyro for changing the attitude of the artificial satellite.

The attitude control data creating method according to the first aspect of this invention makes it possible to shorten the entire time required for the attitude maneuver with respect to the movable object having the flexible member, and also makes it possible to effectively suppress the vibration at the time of the attitude maneuver even if the flexible member of the movable object has a plurality of flexibility modes.

The attitude control system according to the second aspect of this invention makes it possible to shorten the entire time required for the attitude maneuver with respect to the movable object having the flexible member, and also makes it possible to effectively suppress the vibration at the time of the attitude maneuver even if the flexible member of the movable object has the plurality of flexibility modes.

BRIEF DESCRIPTION OF THE DRAWINGS

FIG. 1 (a) shows characteristics of two sampling functions that are shifted by one period from each other and have opposite polarities of positive and negative, whereas FIG. 1 (b) shows a combined characteristic obtained by adding and combining the characteristics of the two sampling functions shown in FIG. 1 (a).

FIG. 2 (a) shows the combined characteristic shown in FIG. 1 (b); FIG. 2 (b) shows a characteristic of a window function for a peak portion of the combined characteristic shown in FIG. 2 (a); and FIG. 2 (c) shows a characteristic obtained by multiplying the combined characteristic shown in FIG. 2 (a) by the characteristic of the window function shown in FIG. 2 (b).

FIG. 5 (a) shows basic mode characteristics represented by relationships of flexibility mode displacement with respect to time, whereas FIG. 5 (b) shows differential mode characteristics represented by relationships of differential flexibility mode displacement with respect to time.

BEST MODE FOR EMBODYING THE INVENTION

First, with reference to FIGS. 1 to 5, description will be made about an attitude control data creating method according to an embodiment of this invention, and an overview of an attitude control apparatus or system applying the method.

The attitude control data creating method is a method of creating attitude control data for an attitude maneuver of a movable object having a flexible member, and includes a sampling function obtaining step of obtaining, based on vibration of the flexible member at a time of the attitude maneuver, a sampling function including no frequency components equal to or higher than a particular frequency and a control target value creating step of creating, by means of the sampling function, a control target value as a previously-frequency-shaping-type feedforward control law. Further, in a control data creating step, the attitude control data is created based on the control target value.

Figure 1:
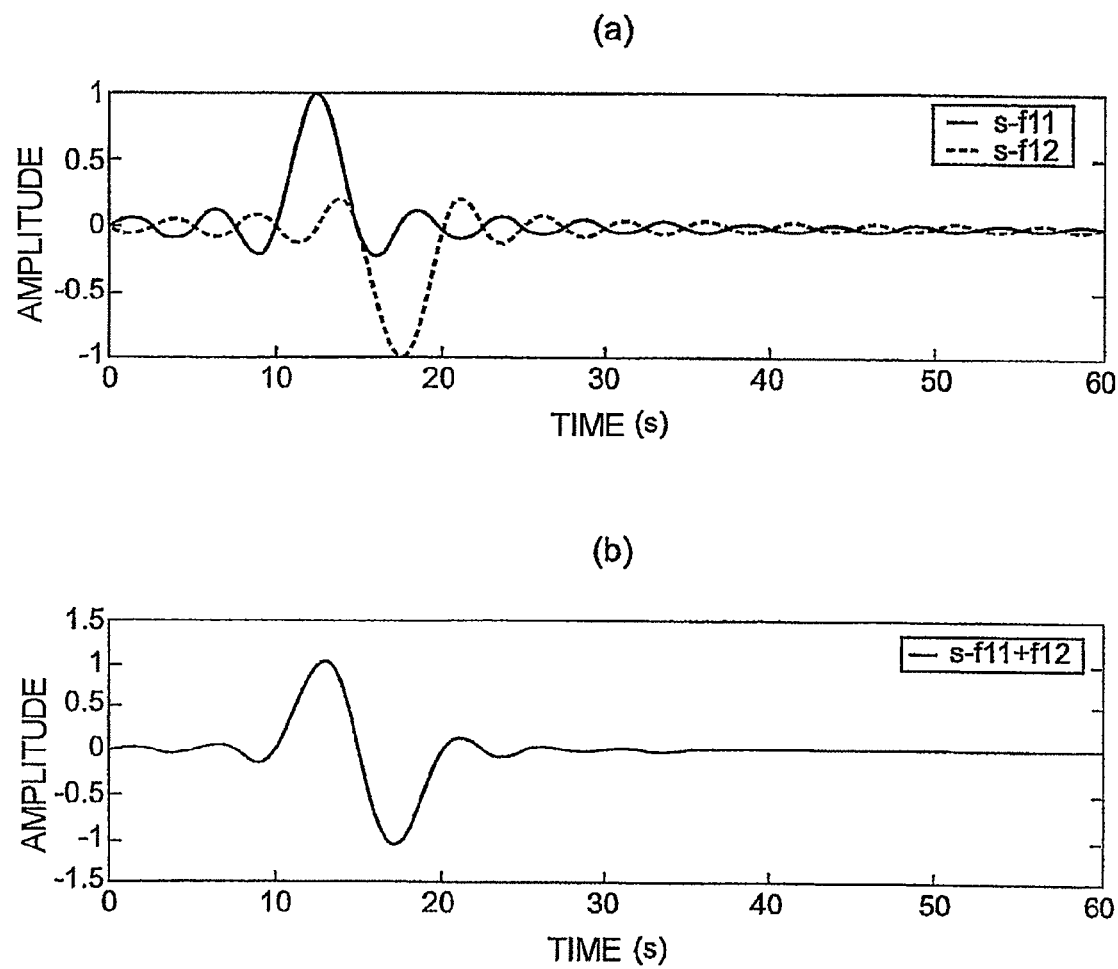
FIG. 1 shows time charts for describing sampling functions used in an attitude control data creating method according to an embodiment of this invention.

FIG. 1 exemplifies characteristics (expressed by relationship of amplitude with respect to time (s)) of the sampling functions used in the control target value creating step. FIG. 1 (a) relates to characteristics (s-f11 and s-f12) of two sampling functions that are shifted by one period from each other and have opposite polarities of positive and negative, whereas FIG. 1 (b) relates to a combined characteristic (s-f11+12) obtained by adding and combining the characteristics shown in FIG. 1 (a).

Referring to FIG. 1 (a), in the aforementioned control target value creating step, used as the characteristics s-f11 and s-f12 of the sampling functions are sinc functions capable of creating a waveform of an attitude profile, which are shifted by one period from each other and have opposite polarities of positive and negative. In FIG. 1 (b), by adding and combining the sampling functions, which are the sinc functions, created is data for acceleration/deceleration, which is expressed as the combined characteristic (s-f11+12) and serves as the control target value.

Figure 2:
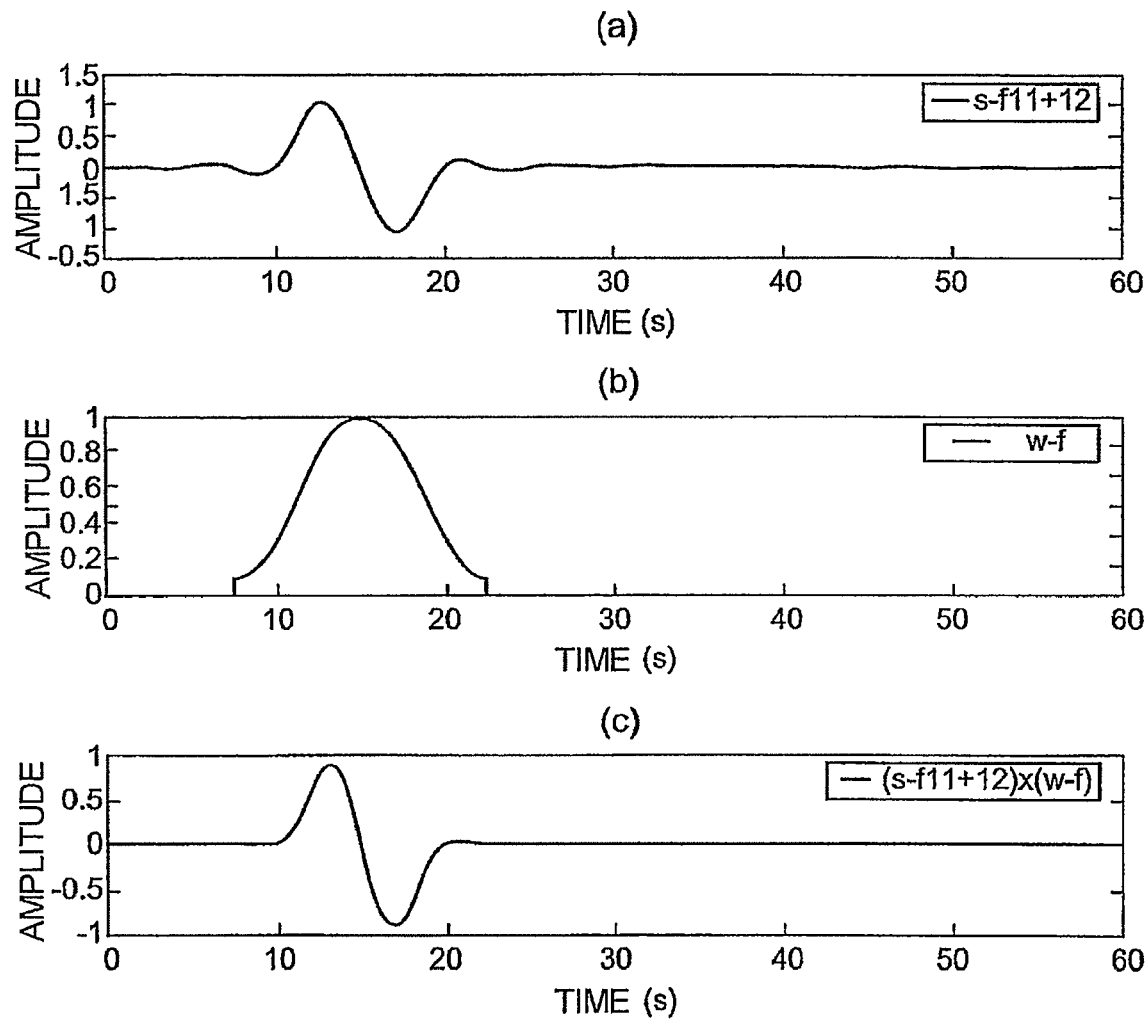
FIG. 2 shows time charts for describing processing of the sampling functions used in the attitude control data creating method according to the embodiment of this invention.

FIG. 2 exemplifies, in a comparing manner, characteristics (expressed by relationship of amplitude with respect to time (s)) in a case where the sampling functions used in the control target value creating step are applied. FIG. 2 (a) relates to the combined characteristic (s-f11+12) shown in FIG. 1 (b); FIG. 2 (b) relates to a characteristic (w-f) of a window function with respect to the peak portion of the characteristic shown in FIG. 2 (*a*); and FIG. 2 (*c*) relates to a characteristic (s-f11+12)×(w-f) obtained by multiplying the characteristic shown in FIG. 2 (*a*) by the characteristic shown in FIG. 2 (*b*).

Here, it is further indicated that, in the control target value creating step, in order to maximally suppress the vibration of the flexible member after the attitude maneuver is completed, the control target value is created as the characteristic (s-f11+12)×(w-f) as shown in FIG. 2 (*c*), which is obtained as the result of multiplying the combined characteristic (s-f11+12) as shown in FIG. 2 (*a*) obtained by combining the sinc functions by the characteristic (w-f) of such a Hamming window function as shown in FIG. 2 (*b*).

Figure 3:
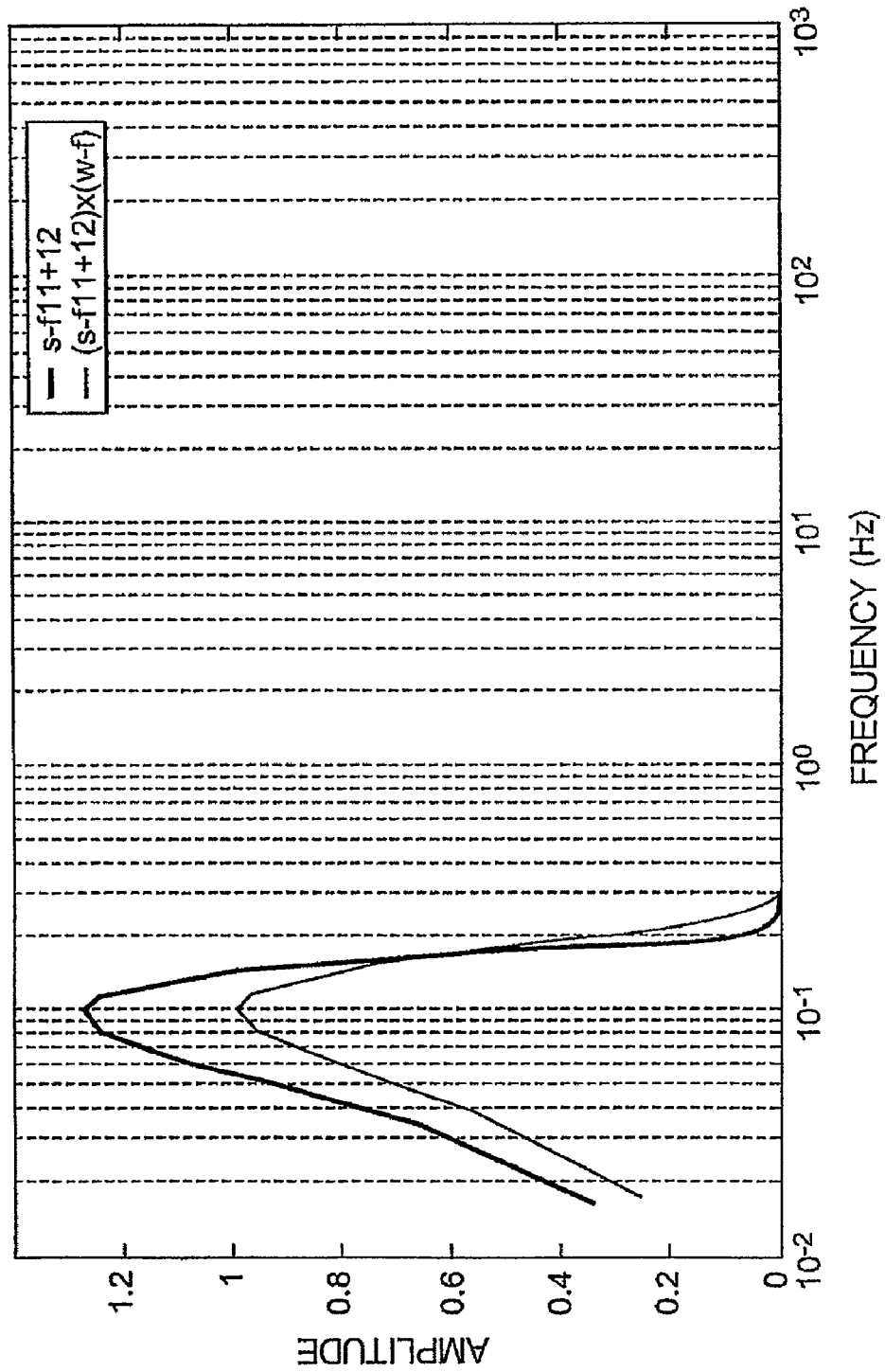
FIG. 3 is a view showing a relationship of amplitude with respect to frequency through comparing the peak portion of the characteristic regarding the window function shown in FIG. 2 (c) and the peak portion of a component characteristic thereof.

FIG. 3 compares the peak portion of the characteristic (s-f11+12)×(w-f) shown in FIG. 2 (*c*) and the peak portion of the component characteristic (s-f11+12) thereof, and shows a relationship of amplitude with respect to frequency (Hz).

Here, it is indicated that, even if the aforementioned characteristic (s-f11+12) obtained through the adding and combining is multiplied by the characteristic (w-f) of the window function, the frequency components are completely separated, that is, in creating the control target value in the control target value creating step, frequency separation can be perfectly performed by using the sinc functions as the sampling functions. This indicates that constant residual vibration of the flexible member after the attitude maneuver can be reduced to approximately zero, and that an observation mission, which is performed through various kinds of attitude maneuvers, can be carried out effectively with the attitude maneuvers that require the shortest period of time. Particularly, because overlapping alone of the sampling functions like the combined characteristic (s-f11+12) shown in FIG. 1 (*b*) results in the vibration lingering on after the attitude maneuver, the combined characteristic (s-f11+12) is multiplied by the characteristic (w-f) of the window function as shown in FIG. 2 (*b*), thereby capable of smoothly attenuating the control target value over a period from the start of the attitude maneuver to the completion of the attitude maneuver, which fact is of importance.

Incidentally, the sampling function (sinc function) is a function commonly known to include no frequency components equal to or higher than a particular frequency bandwidth $\omega_s$ (Hz). It should be noted that the sampling function of the particular frequency bandwidth $\omega_s$ (Hz) is expressed by an expression $$y(t)=\sin(\omega_s t)/\omega_s t.$$

In order to complete the attitude maneuver in the shortest period of time with respect to an artificial satellite, which is a movable object having a flexible member, it is essential for the following two points to be realized: the first point is to use an acceleration/deceleration profile that does not generate the constant vibration of the flexible member; and the second point is to perform such an attitude maneuver as to use the torque capability of an actuator (torque generation device) to the maximum extent.

Of those two points, the first point can be realized by creating an angular acceleration profile (control target value) for the attitude maneuver with respect to the artificial satellite by means of the waveforms of the sampling functions (sinc functions) as shown in FIG. 1 (*a*). The frequency distribution of the angular acceleration profile created using the sampling functions exhibits such a distribution as shown in FIG. 3, which turns out to be a waveform including no frequency components equal to or higher than a particular frequency determined by the sampling function.

Further, the second point can be realized in the following manner. The peak heights of the two sampling functions shown in FIG. 1 (*a*) are shifted by one period from each other, and the positive wave and the negative wave are assumed as angular acceleration waveforms for acceleration and deceleration, respectively. Then, by overlapping the two waves, the angular acceleration profile for acceleration/deceleration of the attitude of the artificial satellite is so created as to have the characteristic as shown in FIG. 2 (*c*). Here, in order to use the capability of the actuator to the maximum extent, the peak of the angular acceleration is set as an angular acceleration for the attitude obtained with the maximum torque capability of the actuator. As a result, it is possible to perform the acceleration/deceleration that makes use of the capability of the actuator to the maximum extent while maintaining the advantage of the first point.

It should be noted that, when the acceleration/deceleration profile is created by overlapping the sampling functions (sinc functions) shifted by one period from each other and if the acceleration/deceleration profile has the characteristic as shown in FIG. 2 (*a*), for example, which is obtained by overlapping the two sampling functions, small waves linger on after the attitude maneuver is completed if nothing is done for that. Accordingly, in order to reduce the vibration from the attitude after the attitude maneuver is completed, it becomes important to further use the waveform as shown in FIG. 2 (*c*) obtained by multiplying the characteristic shown in FIG. 2 (*a*) by the window function as shown in FIG. 2 (*b*) as the angular acceleration profile for acceleration/deceleration of the attitude of the artificial satellite. The multiplication of such a window function as described above enables the vibration from the attitude after the attitude maneuver is completed to be eliminated, thereby ensuring orientational performance with higher accuracy.

Incidentally, it is a generally-known fact that, in a case where the attitude maneuver is actually performed with respect to a flexible member mounted on an artificial satellite or the like, a shortest-path changing (attitude maneuver) between two attitudes can be achieved by performing an attitude rotation about an axis called the Euler axis, which is uniquely obtained from two attitudes. Thus, the attitude maneuver law executed according to this invention is such control as to rotate the attitude of the artificial satellite around the Euler axis obtained from an attitude before the attitude change and a target attitude after the attitude change.

Figure 4:
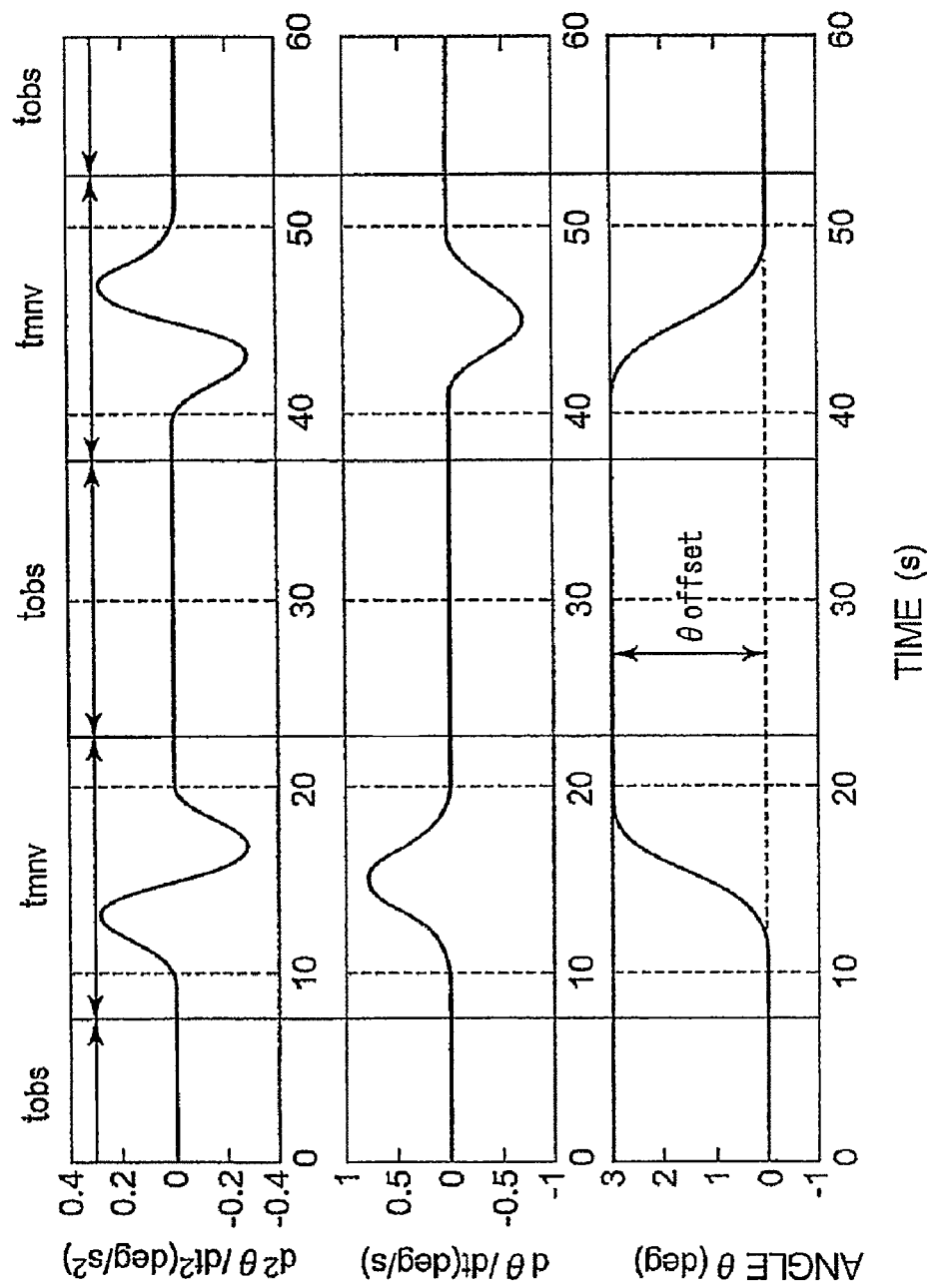
FIG. 4 is a time chart exemplifying characteristics of a maneuver profile serving as a control target value, which is created based on the sampling function in the attitude control data creating method according to the embodiment of this invention.

FIG. 4 exemplifies characteristics of the maneuver profile, which is the control target value created in the control target value creating step after determining the Euler axis. It should be noted that: the bottom part of FIG. 4 relates to an angular characteristic represented by a relationship of angle θ (deg) with respect to time (s); the middle part relates to an angular rate characteristic represented by a relationship of angular rate dθ/dt (deg/s) with respect to time (s); and the top part relates to an angular acceleration characteristic represented by a relationship of angular acceleration $d^2\theta/dt^2$ (deg/$s^2$) with respect to time (s).

Here, assuming that an observation mission period $t_{obs}$ and an attitude maneuver period $t_{mnv}$ are repeated alternately, it is indicated that the attitude maneuver that rotates the attitude of the artificial satellite around the Euler axis is executed based on the angular acceleration characteristic as shown in the top part obtained by differentiating (i.e., second-order differentiating angular characteristic with respect to time (t)), with respect to time (t), the angular rate characteristic as shown in the middle part obtained by differentiating, with respect to time (t), the angular characteristic of a waveform having an offset angle $\theta_{offset}$ of 3 deg (3 degrees) as shown in the bottom part.

On the other hand, the attitude control system applying the attitude control data creating method includes such basic structure as to output a control signal to attitude rotating means for rotating the attitude, which is set to the flexible member and to attitude changing means for changing the attitude, thereby performing the attitude maneuver that changes the flexible member from a certain static state to another static state. Further, the attitude control system is provided with attitude-maneuver control target value creating means for creating, as a previously-frequency-shaping-type feedforward control law, a control target value, which is included as a control element of the control signal in order to suppress the vibration generated by the flexible member at the time of the attitude maneuver and serves as attitude control data at the time of the attitude maneuver, with the use of the sampling functions including no frequency components equal to or higher than a particular frequency.

Here, it is desirable that the attitude-maneuver control target value creating means have the following functions: a function of creating a control target value with the use of sinc functions, as sampling functions, capable of creating a waveform of an attitude profile in which frequency components are completely separated; a function of creating data for acceleration/deceleration as the control target value through shifting by one period from each other two positive and negative waveforms of the sampling functions, which are sinc functions, and combining the waveforms; and a function of creating the control target value through multiplying the sinc function by the window function in order to suppress the vibration of the flexible member to the maximum extent after the attitude maneuver is completed. In any case, regarding the flexible member, when the flexible member is an artificial-satellite flexible moving unit mounted on the artificial satellite, those functions are effective. It is desirable that the artificial-satellite flexible moving unit include a reaction wheel for rotating the attitude of the artificial satellite, a control moment gyro for changing the attitude of the artificial satellite.

In the case of the attitude control system, too, when the attitude maneuver is performed to change the artificial-satellite flexible moving unit from a certain static state to another static state, it is possible to reduce greatly the vibration of the flexible member that is generated by the attitude maneuver by using, as a creating law for the control target value at the time of the attitude maneuver, such sampling functions (sinc functions) including no frequency components equal to or higher than a particular frequency as described above with reference to FIGS. 1 (a), (b) to 4.

Figure 5:
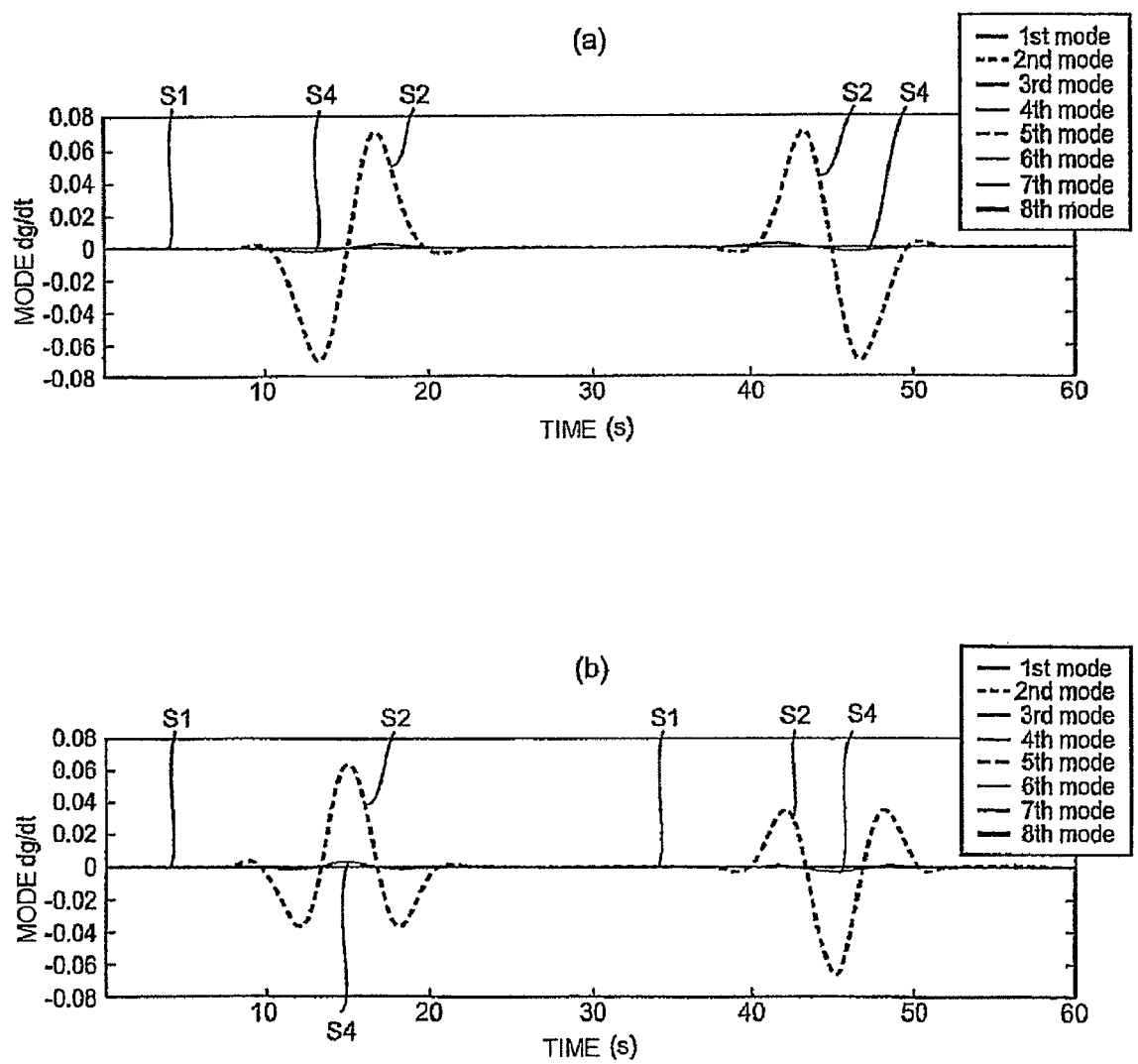
FIG. 5 shows time charts exemplifying characteristics of flexibility mode displacement at the time of an attitude maneuver executed, with respect to a flexible member (artificial-satellite flexible moving unit), by an attitude control system according to the embodiment of this invention.

FIG. 5 exemplifies characteristics of flexibility mode displacement at the time of the attitude maneuver executed by the attitude control system with respect to the artificial-satellite flexible moving unit. FIG. 5 (a) relates to basic mode characteristics represented by a relationship of flexibility mode displacement ξ with respect to time (s), whereas FIG. 5 (b) relates to differential mode characteristics represented by a relationship of differential flexibility mode displacement dξ/dt with respect to time (s).

In other words, FIGS. 5 (a) and (b) show time-history of the mode displacement with regard to the artificial-satellite flexible moving unit at the time of the attitude maneuver. In the case of the basic mode characteristics shown in FIG. 5 (a), a first mode is represented by a characteristic S1, which is zero; a second mode is represented by a characteristic S2, which has two large peaks in negative and positive directions within a period between 10 seconds and 20 seconds, and has other two large peaks in positive and negative directions within a period between 40 seconds and 50 seconds; a fourth mode is represented by a characteristic S4, which has two small peaks in negative and positive directions within the period between 10 seconds and 20 seconds, and has other two small peaks in positive and negative directions within the period between 40 seconds and 50 seconds; and modes for other times (third mode and fifth mode to eighth mode) are almost zero.

In the case of the differential mode characteristics shown in FIG. 5 (b), the first mode is represented by a characteristic S1, which is zero; the second mode is represented by a characteristic S2 having three peaks within the period between 10 seconds and 20 seconds, which are medium, large, and medium in height in negative, positive, and negative directions in the stated order, and having other three peaks within the period between 40 seconds and 50 seconds, which are medium, large, and medium in height in positive, negative, and positive directions in the stated order; the fourth mode is represented by a characteristic S2 having three extremely small peaks (peak at the center pointing at positive is larger than the others) within the period between 10 seconds and 20 seconds in negative, positive, and negative directions in the stated order, and having other three extremely small peaks (peak at the center in the negative direction is larger than the others) within the period between 40 seconds and 50 seconds in positive, negative, and positive directions in the stated order; and modes for other times (third mode and fifth mode to eighth mode) are almost zero.

As described above, when the attitude maneuver is performed using the control target value created based on the aforementioned characteristic (s-f11+12)×(w-f) shown in FIG. 2 (c), the constant vibration hardly lingers on after the attitude maneuver from a certain static state to another static state, and the vibrating state of the attitude immediately subsides, thereby capable of ensuring orientational stability immediately after the attitude maneuver. This enables the attitude maneuver to be completed in the shortest period of time required, thereby making it possible to effectively carry out the observation mission, which is performed through various kinds of attitude maneuvers, with the attitude maneuvers that require the shortest period of time.

Figure 6:
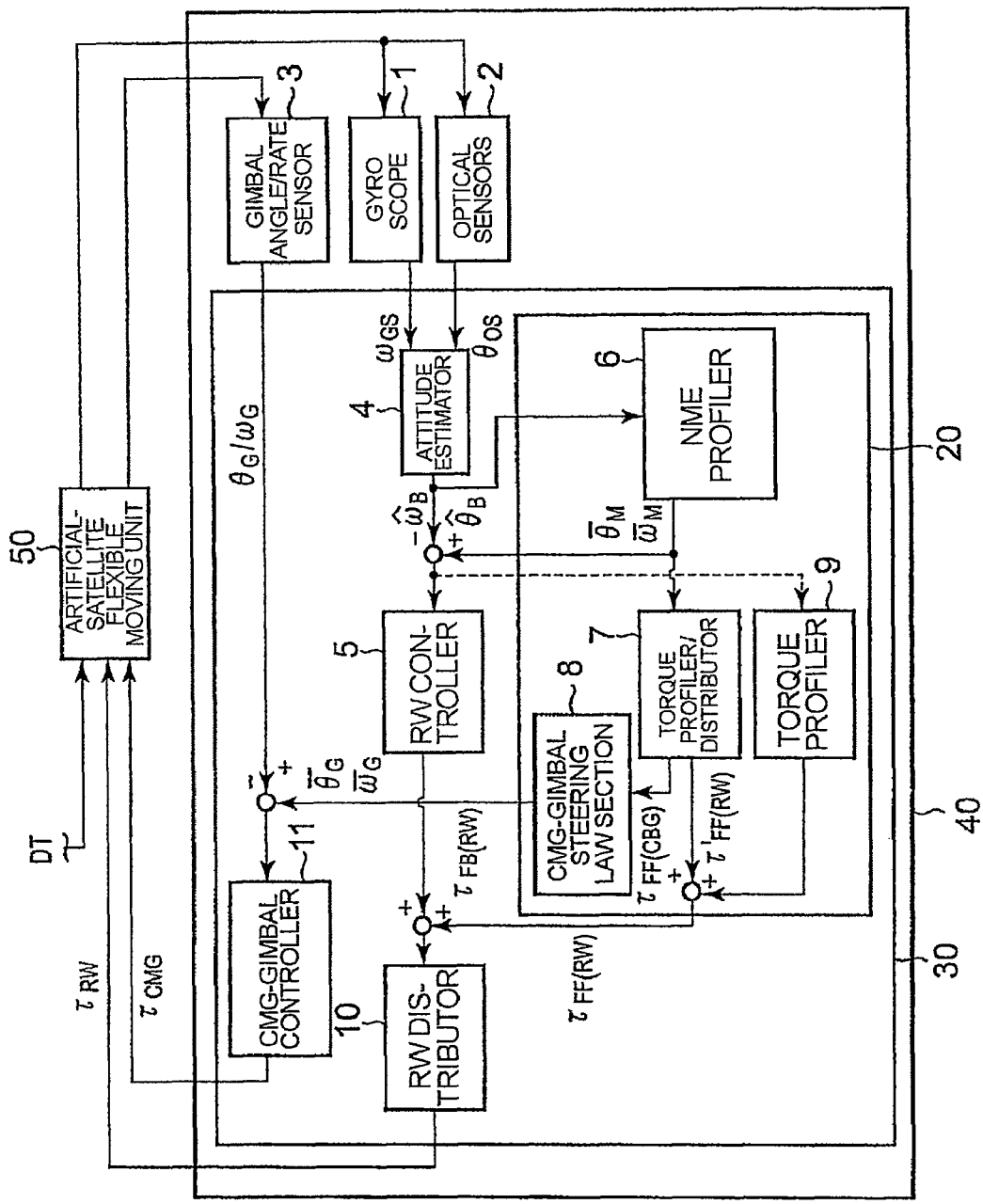
FIG. 6 is a functional block diagram showing basic structure of the attitude control system for an artificial satellite, which applies the attitude control data creating method according to the embodiment of this invention.

Next, referring also to FIG. 6, the artificial-satellite-purpose attitude control system applying the aforementioned attitude control data creating method is described.

An attitude control system (ACS) 40, to which a disturbance torque (DT) signal (may be also referred to as suppression torque signal) is input from an external other electrical system (not shown), performs attitude control with respect to a main body of an artificial satellite (not shown) by outputting control signals $\tau_{RW}$ and $\tau_{CMG}$ to a reaction wheel (RW) (not shown) and a control moment gyro (CMG) (not shown), respectively, within an artificial-satellite flexible moving unit 50, on which the reaction wheel (RW) for rotating the attitude of the artificial satellite and the control moment gyro (CMG) for changing the attitude of the artificial satellite are installed. Incidentally, the reaction wheel (RW) is an actuator, which can generate reaction torque by spinning a flywheel, thereby enabling the attitude of the artificial satellite to rotate. The control moment gyro (CMG) is an actuator, which can generate torque with gyroscopic precession by spinning, by means of a gimbal having a rotation axis orthogonal to the rotation axis of a flywheel, the flywheel spinning at constant spinning speed, thereby enabling the rotation of the attitude of the artificial satellite to be controlled.

As basic structure, the hardware portion of the attitude control system (ACS) 40 includes: gyro scopes (GS) 1, which are gyro sensors serving as attitude information sensors for the artificial-satellite flexible moving unit 50; optical sensors (OS) 2 having functions of detecting angles of the artificial-satellite flexible moving unit 50 with respect to fixed stars, the earth, and the sun; a gimbal angle/rate sensor 3 for detecting an angle-angular rate ratio of the gimbal of the control moment gyro (CMG) for the artificial-satellite flexible moving unit 50; and attitude control electronics (ACE) 30 that output the control signals $\tau_{RW}$ and $\tau_{CMG}$ to the reaction wheel (RW) and the control moment gyro (CMG) in accordance with information from the respective sensors.

The gyro scopes (GS) 1 are sensors that output an angular rate signal $\omega_{GS}$ containing information on detected angular rates ω of the artificial satellite rotating about three perpendicular axes thereof with respect to an inertial space (herein, may be perceived as cosmic space) (alternatively, may output angle detection signal $\theta_{GS}$ containing information on detected angles θ). The optical sensors (OS) 2 are a set of sensors that output an angle detection signal $\theta_{OS}$ containing information on detected angles with respect to fixed stars, the earth, and the sun. It should be noted that the aforementioned reaction wheel (RW), control moment gyro (CMG), gyro scopes (GS) 1, and optical sensors (OS) 2 are widely used in the field concerning attitude control of artificial satellites, and are not directly related to the technological gist of this invention. Hence, the description of detailed configurations or functions thereof is omitted.

The gimbal angle/rate sensor 3 is a sensor that outputs an angle-angular rate ratio signal $\theta_G/\omega_G$ indicating a ratio between angle and angular rate detected with the gimbal of the control moment gyro (CMG).

The attitude control electronics (ACE) 30 include: an attitude estimator (AE) 4 that outputs, based on the angular rate signal $\omega_{GS}$ from the gyro scopes (GS) 1 and the angle detection signal $\theta_{OS}$ from the optical sensors (OS) 2, an angular rate estimation signal indicating an estimation value of an angular rate $\omega_B$ and an angle estimation signal indicating an estimation value of an angle $\theta_B$, which are necessary for the attitude control of the main body of the artificial satellite; an attitude guidance law section (AGL) 20 that is responsible for creating and outputting an angle target signal indicating a target value of an angle $\theta_M$ and an angular rate target signal indicating a target value of an angular rate $\omega_M$, the target values of the angle $\theta_M$ and angular rate $\omega_M$ being the target attitude profile that indicates, in accordance with the Euler axis obtained from the initial attitude and the attitude after the change, the control target value necessary for the attitude maneuver prior to executing the attitude maneuver based on the estimation values of the angular rate $\omega_B$ and angle $\theta_B$ from the attitude estimator (AE) 4, responsible for creating and outputting, based on a detection result of an attitude drift, an angle target signal indicating a target value of an angle $\theta_G$ and an angular rate target signal indicating a target value of an angular rate $\omega_G$, which are for the gimbal of the control moment gyro (CMG), and responsible for creating and outputting a control signal $\tau_{FF(RW)}$ serving as the feedforward control law for the reaction wheel (RW); a subtractor for subtracting the angular rate estimation signal and angle estimation signal from the attitude estimator (AE) 4 from the angle target signal and angular rate target signal from the attitude guidance law section (AGL) 20, respectively; an RW controller 5 that receives a subtracted value from the aforementioned subtractor as a signal indicating the attitude drift (AD), and that creates and outputs a control signal $\tau_{FB(RW)}$ as a feedback quantity with respect to the reaction wheel (RW) through PID control; an adder for adding the control signal $\tau_{FF(RW)}$ from the attitude guidance law section (AGL) 20 to the control signal $\tau_{FB(RW)}$ from the RW controller 5; an RW distributor 10 that receives an added value from the aforementioned adder, and that creates and outputs the control signal $\tau_{RW}$ by pseudo-inversion; another subtractor for subtracting the angle-angular rate ratio signal $\theta_G/\omega_G$ from the gimbal angle/rate sensor 3 from the angle target signal and angular rate target signal from the attitude guidance law section (AGL) 20; and a CMG-gimbal controller 11 that receives a subtracted value from the another subtractor and creates and outputs the control signal $\tau_{CMG}$ for the gimbal of the control moment gyro (CMG) through PD control.

Further, the attitude guidance law section (AGL) 20 includes: an NME profiler 6 serving as control target value creating means that kinematically obtains the Euler axis from the initial attitude and the attitude after the change, prior to executing the attitude maneuver based on the estimation values of the angular rate $\omega_B$ and angle $\theta_B$ from the attitude estimator (AE) 4, and that outputs the angle target signal indicating the target value of the angle $\theta_M$ and the angular rate target signal indicating the target value of the angular rate $\omega_M$, the target values of the angle $\theta_M$ and angular rate $\omega_M$ being the target attitude profile indicating, in accordance with the Euler axis, the control target value necessary for the attitude maneuver; a torque profiler/distributor 7 that creates and outputs a control signal $\tau_{FF(CMG)}$ serving as the feedforward control law with respect to the control moment gyro (CMG) after receiving the angle target signal and the angular rate target signal from the NME profiler 6, and a control signal $\tau'_{FF(RW)}$ serving as the feedforward control law with respect to the reaction wheel (RW) through inversion; a torque profiler 9 that receives a signal (shown as dotted line) indicating the attitude drift from the input side of the RW controller 5, and that creates and outputs a torque profile signal by reducing the bias flow of the signal; an adder for adding the torque profile signal from the torque profiler 9 to the control signal $\tau'_{FF(RW)}$ from the torque profiler/distributor 7 to output the control signal $\tau_{FF(RW)}$ serving as the feedforward control law with respect to the reaction wheel (RW); and a CMG-gimbal steering law section 8 for creating and outputting the angle target signal indicating the target value of the angle $\theta_G$ and the angular rate target signal indicating the target value of the angular rate $\omega_G$ for the gimbal of the control moment gyro (CMG) based on the control signal $\tau_{FF(CMG)}$ from the torque profiler/distributor 7.

It should be noted that each section of the attitude control electronics (ACE) 30 can be configured with a hard-wired logic circuit alone, but also can have a configuration in which a computer such as a CPU is integrated and control logic is executed by software. Here, it is assumed that the NME profiler 6, the torque profiler/distributor 7, and the CMG-gimbal steering law section 8, which are inside the attitude guidance law section (AGL) 20 of the attitude control electronics (ACE) 30, and the attitude estimator (AE) 4, the RW controller 5, the RW distributor 10, and the CMG-gimbal controller 11, which are outside the attitude guidance law section (AGL) 20, are implemented by software.

Technical functions of the respective sections implemented by the software are briefly described. The attitude estimator (AE) 4 has a function of estimating a current attitude of the artificial-satellite flexible moving unit 50 from the output of the gyro scopes (GS) 1 and the output of the optical sensors (OS) 2. The NME profiler 6 is a section that executes the previously-frequency-shaping-type feedforward control law for the attitude maneuver, and creates a profile of the control target value (target attitude) for that purpose. The torque profiler/distributor 7 has a function of calculating control torque necessary for realizing the profile of the target attitude, as well as a function of calculating, at the same time, a decoupling quantity necessary for avoiding the coupling effects caused by the angular momentum of the satellite, and has, as a distribution function, a function of distributing the control torque obtained through the calculation between the control moment gyro (CMG) and the reaction wheel (RW).

The CMG-gimbal steering law section 8 calculates a gimbal angle profile and a gimbal angular rate profile for the control moment gyro (CMG), which are necessary for outputting the control torque that has been distributed for the control moment gyro (CMG). The CMG-gimbal controller 11 performs minor-loop control for enabling the gimbal to perform a target movement, based on a gimbal angle error and a gimbal angular rate error that are obtained through comparison between the current state of the gimbal obtained from the gimbal angle/rate sensor 3 and the target state of the gimbal. The RW controller 5 calculates feedback control torque for enabling the attitude to achieve a target movement, based on an attitude angle error and an attitude angular rate error. The RW distributor 10 serves for distributing to each reaction wheel the feedback control torque necessary for the attitude to achieve the target movement.

The configurations of the respective sections described above are made by employing well-known configurations that are often used for the attitude control of artificial satellites, except for the configuration of the NME profiler 6 for calculating an optimal feedforward control law that prevents generating a characteristic frequency of the flexible member.

Then, an operation of the NME profiler 6 is described in detail. In this operation, the angular acceleration profile (characteristic of top part) shown in FIG. 4 is employed along the Euler axis obtained from the attitude before the attitude change and the target attitude after the attitude change, whereby the attitude maneuver that rotates the attitude of the artificial satellite is executed. Specifically, the NME profiler 6 identifies the Euler axis from the initial attitude and the attitude after the change prior to executing the attitude maneuver, and obtains, in accordance with the Euler axis, the characteristic as shown in the top part of FIG. 4, which is obtained by calculating changes in angular acceleration of the artificial satellite around the Euler axis and is capable of realizing the attitude maneuver with the shortest path. During the attitude maneuver, the NME profiler 6 continuously creates the attitude control target value having the aforementioned characteristic for the artificial satellite, which is then provided to the attitude guidance law section (AGL) 20 for executing the attitude guidance law in the control moment gyro (CMG) and the RW controller 5 for performing the PID control loop. If the artificial satellite is rotated in accordance with such a target value as described above, attitude change control with the shortest path can be realized while the vibration of the reaction wheel (RW) and the control moment gyro (CMG) of the artificial-satellite flexible moving unit 50, which is the flexible member, is suppressed to the maximum extent.

With combinations of the aforementioned functions, the artificial satellite employs a theoretically shortest path, preventing the flexible member from generating vibration to the maximum extent. Consequently, an attitude maneuver with high accuracy can be performed.

It should be noted that the following system configuration is also viable. The actuator portion (reaction wheel (RW) or control moment gyro (CMG)) of the artificial-satellite flexible moving unit 50, with which the attitude maneuver is performed by means of the attitude control system 40 shown in FIG. 6 is replaced with the reaction wheel (RW) or a thruster, and the CMG-gimbal steering law section 8 is replaced with one for the reaction wheel (RW) or the thruster. Even in such a case, similar effects can be expected. In this case, however, because the reaction wheel (RW) is generally smaller in maximum output torque than the control moment gyro (CMG) but can generate small control torque with higher accuracy, the configuration concerned is suitable for a case where it is required that small-angle attitude change be performed with higher accuracy. Further, in general, the thruster is larger than the reaction wheel (RW) but smaller than the control moment gyro (CMG) in generation of control torque, and does not have a smooth output torque characteristic unlike the reaction wheel (RW) or the control moment gyro (CMG). Accordingly, the configuration concerned generally exhibits slightly rough attitude accuracy. As can be seen from the above, with slight alteration, the attitude control system 40 can be used without limiting the kinds of actuators, and it is possible to perform such an attitude maneuver as to make efficient use of the capability of each actuator.

In other words, in the case of the aforementioned attitude control system 40, regarding the feedforward control law generally employed for a high-accuracy attitude maneuver of an artificial satellite, generated is the characteristic (angular acceleration profile) of the control target value as the feedforward control law, which is previously determined as shown in the top part of FIG. 4 through waveform shaping of the sampling functions (sinc functions) including no frequency equal to or higher than a particular frequency as shown in FIG. 1 (*b*) and FIG. 3. Accordingly, the attitude control system 40 has a feature that enables the attitude maneuver suppressing the vibration of the flexible member to the maximum extent as shown as the mode characteristics at the time of the attitude maneuver in FIGS. 5 (*a*) and (*b*). Besides, through shifting the two waves of the sampling functions (sinc functions) shown in FIG. 1 (*a*) having the positive and negative polarities by one period from each other and overlapping the resultant waves, the angular acceleration profile that maintains the frequency separation effects as shown in FIG. 1 (*b*) and FIG. 3 is employed, thereby enabling attitude acceleration and deceleration. Further, in a case where only the sampling function (sinc function) is used, the constant vibration of the flexible member is not generated, but the vibration components, which are generated as forced solutions due to the forcing force, remain after the attitude maneuver has been completed. With this regard, through multiplying the sampling function by the window function as shown in FIG. 2 (*b*) so that the both ends of the waveform from the start point (acceleration start) to the end point (deceleration completion) of the attitude maneuver become zero, it is possible to make zero the forced solutions (residual vibration) after the attitude maneuver has been completed as shown as the mode characteristics at the time of the attitude maneuver in FIGS. 5 (*a*) and (*b*).

According to the aforementioned attitude control data creating method, with the use of the sampling functions (sinc functions) including no frequency components equal to or higher than a particular frequency, the control target value that is to serve as the attitude control data at the time of the attitude maneuver is generated as the previously-frequency-shaping-type feedforward control law. As a result, it is possible to effectively suppress the vibration even if the attitude maneuver is performed with respect to a commonly-used flexible member having a great number of flexibility modes (serving as excitation avoiding method that is effective to frequencies equal to or higher than a particular frequency), and it is also possible to remarkably shorten the entire time required for the attitude maneuver in an unprecedented manner. The attitude control system applying the method described above makes it possible, with a simple configuration, to perform the attitude maneuver using the reaction wheel, the control moment gyro, and the like, promptly and accurately. Particularly, such an attitude control system is greatly effective in performing the attitude maneuver with high accuracy with respect to an artificial satellite including a large flexible member.

INDUSTRIAL APPLICABILITY

The attitude control data creating method and the attitude control system applying the method according to this invention are applicable to an attitude maneuver with respect to an artificial satellite, which is a movable object installed with a flexible member, as well as applicable for the purpose of controlling a robot manipulator, which is a movable object.

The invention claimed is:

1. An attitude control data creating method of creating attitude control data for an attitude maneuver with respect to an artificial satellite having a flexible member, comprising:
a sampling function obtaining step of obtaining, based on vibration of the flexible member at a time of the attitude maneuver, a sampling function excluding frequency components equal to or higher than a particular frequency, the sampling function being a sinc function capable of creating a waveform of an attitude profile in which frequency components are completely separated;
a control target value creating step of creating, by means of the sampling function, a control target value as a previously-frequency-shaping-type feedforward control law; and
a control data creating step of creating, based on the control target value, the attitude control data.

2. An attitude control data creating method as claimed in claim 1, wherein the control target value creating step comprises creating the control target value by multiplying the sinc function by a window function so as to suppress the vibration of the flexible member after the attitude maneuver to a maximum extent.

3. An attitude control data creating method as claimed in claim 1, wherein the control target value creating step comprises creating, as the control target value, data for acceleration/deceleration by shifting two positive and negative waveforms of the sampling function, which is the sinc function, by one period from each other and combining the waveforms.

4. An attitude control data creating method as claimed in claim 3, wherein the control target value creating step comprises creating the control target value by multiplying the sinc function by a window function so as to suppress the vibration of the flexible member after the attitude maneuver to a maximum extent.

5. An attitude control system for controlling an attitude of an artificial satellite having a flexible member subjected to an attitude maneuver, comprising control target value creating means for creating, by means of a sampling function excluding frequency components equal to or higher than a particular frequency, a control target value as a previously-frequency-shaping-type feedforward control law, wherein the sampling function is a sinc function capable of creating a waveform of an attitude profile in which frequency components are completely separated.

6. An attitude control system as claimed in claim 5, wherein the control target value creating means obtains, based on vibration of the flexible member at a time of the attitude maneuver, the sampling function.

7. An attitude control system as claimed in claim 5, further comprising attitude changing means for changing the attitude of the artificial satellite by means of attitude control data created based on the control target value.

8. An attitude control system as claimed in claim 7, further comprising attitude rotating means for rotating the artificial satellite, the attitude rotating means being installed in the artificial satellite.

9. An attitude control system as claimed in claim 5, wherein the control target value creating means creates the control target value by multiplying the sinc function by a window function.

10. An attitude control system as claimed in claim 5, wherein the control target value creating means creates, as the control target value, data for acceleration/deceleration by shifting two positive and negative waveforms of the sampling function, which is the sinc function, by one period from each other and combining the waveforms.

11. An attitude control system as claimed in claim 10, wherein the control target value creating means creates the control target value by multiplying the sinc function by a window function.

12. An attitude control system as claimed in claim 5, wherein:
the artificial satellite comprises an artificial satellite; and
the flexible member comprises a flexible moving unit mounted on the artificial satellite.

13. An attitude control system according to claim 12, wherein the flexible moving unit comprises:
a reaction wheel for rotating the attitude of the artificial satellite; and
a control moment gyro for changing the attitude of the artificial satellite.

14. An attitude control system as claimed in claim 6, further comprising attitude changing means for changing the attitude of the artificial satellite by means of attitude control data created based on the control target value.

15. An attitude control system as claimed in claim 14, further comprising attitude rotating means for rotating the artificial satellite, the attitude rotating means being installed in the artificial satellite.

* * * * *